United States Patent
Crosmer et al.

(10) Patent No.: US 7,779,254 B1
(45) Date of Patent: Aug. 17, 2010

(54) MECHANISM TO ENHANCE AND ENFORCE MULTIPLE INDEPENDENT LEVELS OF SECURITY IN A MICROPROCESSOR MEMORY AND I/O BUS CONTROLLER

(75) Inventors: Julianne R. Crosmer, Cedar Rapids, IA (US); John G. Bendickson, Vinton, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 1247 days.

(21) Appl. No.: 11/314,981

(22) Filed: Dec. 21, 2005

(51) Int. Cl.
*H04L 29/06* (2006.01)

(52) U.S. Cl. .................. 713/166; 726/27; 710/22

(58) Field of Classification Search .................. 713/166
See application file for complete search history.

(56) References Cited

U.S. PATENT DOCUMENTS

| | | | |
|---|---|---|---|
| 5,319,765 A * | 6/1994 | Kimura | 711/164 |
| 5,343,525 A * | 8/1994 | Hung et al. | 713/193 |
| 6,510,522 B1 * | 1/2003 | Heinrich et al. | 726/34 |
| 6,986,053 B1 * | 1/2006 | Schwartz et al. | 713/193 |
| 2003/0130969 A1 * | 7/2003 | Hawkins et al. | 706/15 |
| 2006/0069880 A1 * | 3/2006 | Mielenz et al. | 711/149 |

* cited by examiner

*Primary Examiner*—Kambiz Zand
*Assistant Examiner*—Amare Tabor
(74) *Attorney, Agent, or Firm*—Matthew J. Evans; Daniel M. Barbieri

(57) ABSTRACT

The present invention is a system and a method for extending multiple independent levels of security to a plurality of input/output buses and components connected to the buses. In an exemplary embodiment, the system may include a processing unit suitable for operation in a plurality of security level. A bus controller including security control logic may be coupled to the processing unit for restricting access and flow of information between the physical memory and the plurality of buses. The bus controller may employ base address registers to allocate and map the physical memory to control which partitions of the physical memory are accessible to each of the plurality of buses and thus, a device connected to at least one of the plurality of buses.

7 Claims, 5 Drawing Sheets

MECHANISM TO ENHANCE AND ENFORCE MULTIPLE INDEPENDENT LEVELS OF SECURITY IN A MICROPROCESSOR MEMORY AND I/O BUS CONTROLLER

FIELD OF THE INVENTION

The present invention relates generally to the field of processor interface devices and more particularly, to an apparatus and a system for providing multiple independent levels of security in a microprocessor memory and input/output (I/O) bus controller.

BACKGROUND OF THE INVENTION

In both civil and military arenas, providing secure computer transactions is of an ever increasing concern. Since an operating system (OS) controls the allocation and usage of computer hardware resources (e.g., memory, control processing unit, peripheral devices, and disk space), such system plays a pivotal role in controlling both internal and external security threats. For example, an OS may have the ability to prevent unauthorized use of computer hardware resources. Conversely, if an OS does not prevent or limit the damage of an unauthorized access, the entire computer/network system may be compromised.

A current approach known as Multiple Independent Levels of Security (MILS) architecture has been implemented within operating systems to address the problem of operating system security. The MILS architecture utilizes a layered approach which ensures that programs and data in one partition are inaccessible to any other partition. The separation assurance is made by using a Memory Management Unit (MMU) of a microprocessor to allow any program running in User Mode to access only memory regions assigned to a particular partition. In this manner, data from distinct security classifications, e.g., Secret versus Top Secret, may be kept separate as if they resided in physically distinct processing units.

The MILS architecture is limited by the currently available system configurations in which the architecture is associated. For instance, when data is passed to and from I/O devices, the data must pass through the processor's interface device (e.g., memory and I/O bus controller) leaving data highly vulnerable to intentional and accidental movement to or monitoring from illicit locations. For example, when data is placed onto a standard, multi-drop I/O bus, such as PCI® or PCI-X® (registered trademarks of PCI SGI—Peripheral Component Interconnect Special Interest Group), any device on the bus may read the data. As such, the currently available interface devices expose data to the I/O buses and to leakage into or out of memory regions belonging to another partition, thus breaking down any guarantee of separation for the MILS environment.

Therefore, it would be desirable to provide a device and method that extends MILS partitioning to the I/O devices.

SUMMARY OF THE INVENTION

In accordance with a first aspect of the present invention, a system for extending multiple independent levels of security from a processing unit to a plurality of input/output buses and each component connected thereto is provided. The system may include a processing unit suitable for operating in a plurality of security levels. In addition, a bus controller may be coupled to the processing unit. For example, the bus controller includes security control logic for restricting access and flow of information between the physical memory and the plurality of buses. The bus controller may employ base address registers to allocate and map the physical memory to control which partitions of the physical memory are accessible to each of the plurality of buses and in turn, each component connected to the plurality of buses. Thus, the present system extends multiple independent levels of security from the processing unit to the plurality of input/output buses and each component connected thereto.

In accordance with specific aspects of the system, the security control logic may include partition protection logic to monitor accesses to the physical memory. For example, the partition protection logic includes a register for indicating partition activity. Further, the partition protection logic may report invalid accesses to a system master. For instance, the partition protection logic prohibits future access to physical memory until approved by the system master. In addition, the partition protection logic may be controlled by a memory management unit of a microprocessor. In another aspect, the partition protection logic includes a set of registers for indicating which regions of the physical memory and an input/output memory are accessible.

In accordance with a further aspect of the present invention, a bus controller for extending multiple independent levels of security is provided. In such aspect, the bus controller may include security control logic for restricting access and flow of information between a physical memory and a plurality of input/output buses. Further, a plurality of base address registers may be employed by the bus controller to control physical memory access by each of the plurality of input/output buses. For instance, the base address registers may include translation logic. The plurality of base address registers are utilized to allocate and map the physical memory making the physical memory accessible to at least one of the plurality of input/output buses via its base address register for a designated operating system partition so that an application within that partition is allowed access to a device on that at least one of the plurality of input/output buses.

In accordance with an additional aspect of the present invention, a method for extending multiple independent levels of security from a partitioned operating system to a plurality of input/output buses and each input/output device connected thereto is provided. The method may include inserting a section of security control logic into a bus interface device to ensure data separation. The method may involve the bus interface device demarcating regions within a physical memory using base address registers to control what regions of physical memory are accessible by each of the plurality of input/output buses. The physical memory may be allocated and mapped so to allow the physical memory to be accessible to at least one of the plurality of input/output buses via its base address register for a specified operating system partition. Such action may also allow an application in that partition to access the input/output device connected to the at least one of the plurality of input/output buses. In addition, the method may include performing direct memory access by the input/output device connected to the at least one of the plurality of input/output buses. If access is outside a permitted range, a bus cycle may be aborted and such activity reported to a system master.

In accordance with an even further aspect of the present invention an additional method for extending multiple independent levels of security from a partitioned operating system to a connected device is provided. In such aspect, the method may include preparing the device to receive incoming data via direct memory access. For example, the preparation may include allocating the device's physical memory, mapping the physical memory into a partition's virtual address space and programming a base address register on the device to reveal the physical memory. In addition, the method may involve copying the incoming data automatically via direct memory access into a designated chain of buffers and verifying the validity of each event from the device base address register to a primary system memory on each direct memory access operation. Moreover, an interrupt may be generated which is fielded by a partitioned operating system. Once the interrupt has been identified as belonging to the desired partition, the process or thread designated to handle the event is scheduled and run during the partition's time slice. Further, the received data may be transferred from a direct access memory-designated memory into an application's data memory for further processing during which time a security assisted bus controller may verify that the memory accesses belong to the partition.

It is to be understood that both the foregoing general description and the following detailed description are exemplary and explanatory only and are not restrictive of the invention as claimed. The accompanying drawings, which are incorporated in and constitute a part of the specification, illustrate an embodiment of the invention and together with the general description, serve to explain the principles of the invention.

BRIEF DESCRIPTION OF THE DRAWINGS

The numerous advantages of the present invention may be better understood by those skilled in the art by reference to the accompanying figures in which.

DETAILED DESCRIPTION OF THE INVENTION

Reference will now be made in detail to the presently preferred embodiments of the invention, examples of which are illustrated in the accompanying drawings. It is to be appreciated that corresponding reference numbers refer to generally corresponding structures.

Figure 1:
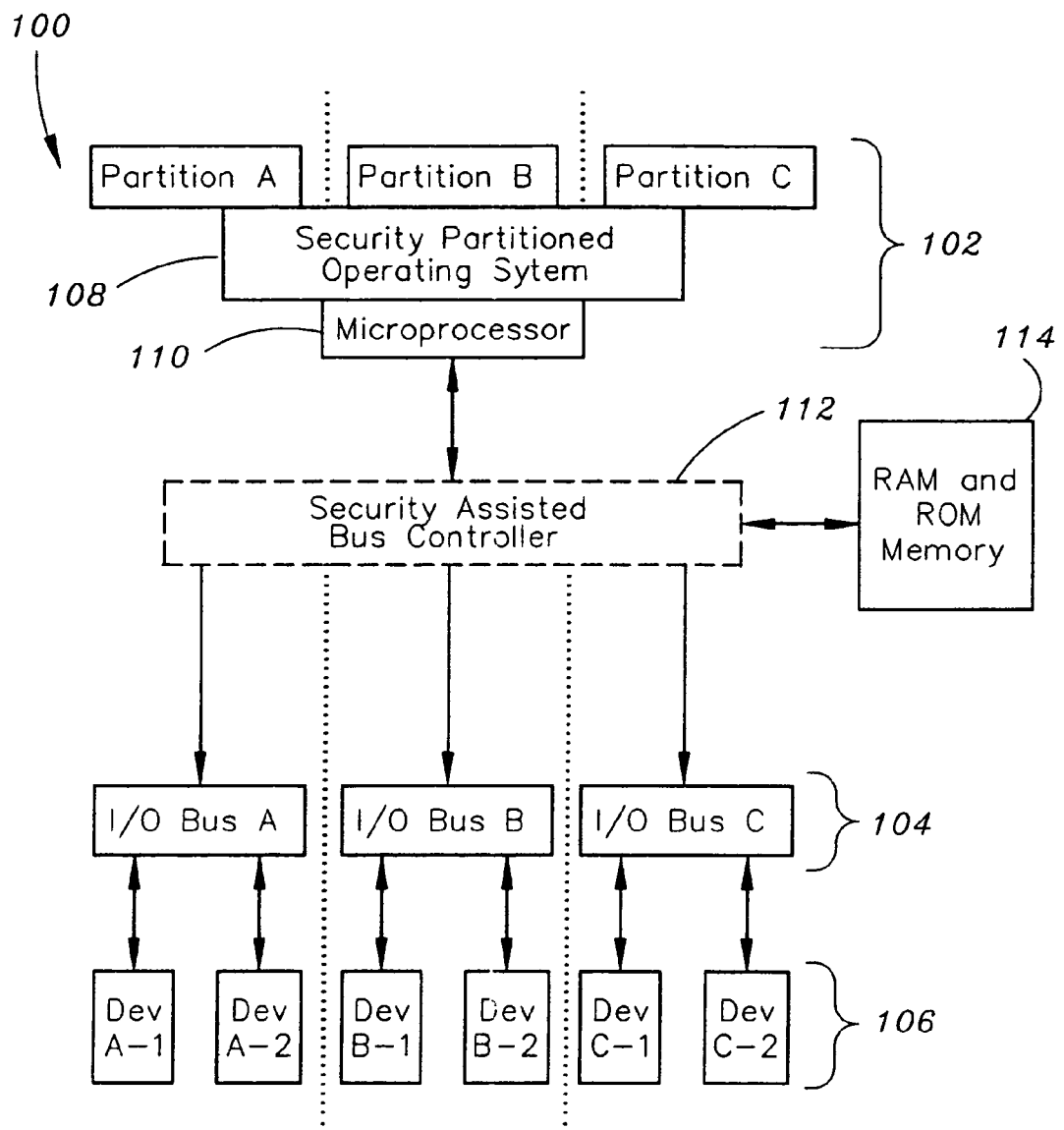
FIG. 1 is a schematic diagram of a system in accordance with an exemplary embodiment of the present invention, wherein the system includes a security assisted bus controller.

Referring to FIG. 1, a system 100 for extending multiple independent levels of security from a processing unit 102 to a plurality of input/output buses 104 and components/devices 106 connected thereto is provided. The system 100 may include a processing unit 102 suitable for operating in a plurality of security levels. For instance, the processing unit 102 may include at least one partition. In such environment, each partition may include an independent security level. As illustrated in FIG. 1, three partitions (Partition A, Partition B, and Partition C) may be employed in which each partition has a different security level. For example, Partition A may be classified as Top Secret, Partition B as Secret, and Partition C as civilian. Further, the processing unit 102 may include a microprocessor 110 capable of executing a security partitioned operating system 108. The security partitioned operating system 108 may be an operating system compliant with the MILS (Multiple Independent Levels of Security) High Assurance Protection Profile to ensure that programs and data in one partition are inaccessible to any other partition. Moreover, the microprocessor 110 may include a memory management unit to ensure such separation. In addition, the system 100 includes a security assisted bus controller or interface device 112 which may be coupled to the processing unit 102, the plurality of input/output buses 104, and a memory 114 (e.g., physical memory). The security assisted bus controller 112 may extend the multiple independent levels of security from the processing unit 102 to the plurality of input/output buses 104 and the various devices/components 106 connected thereto.

Figure 2:
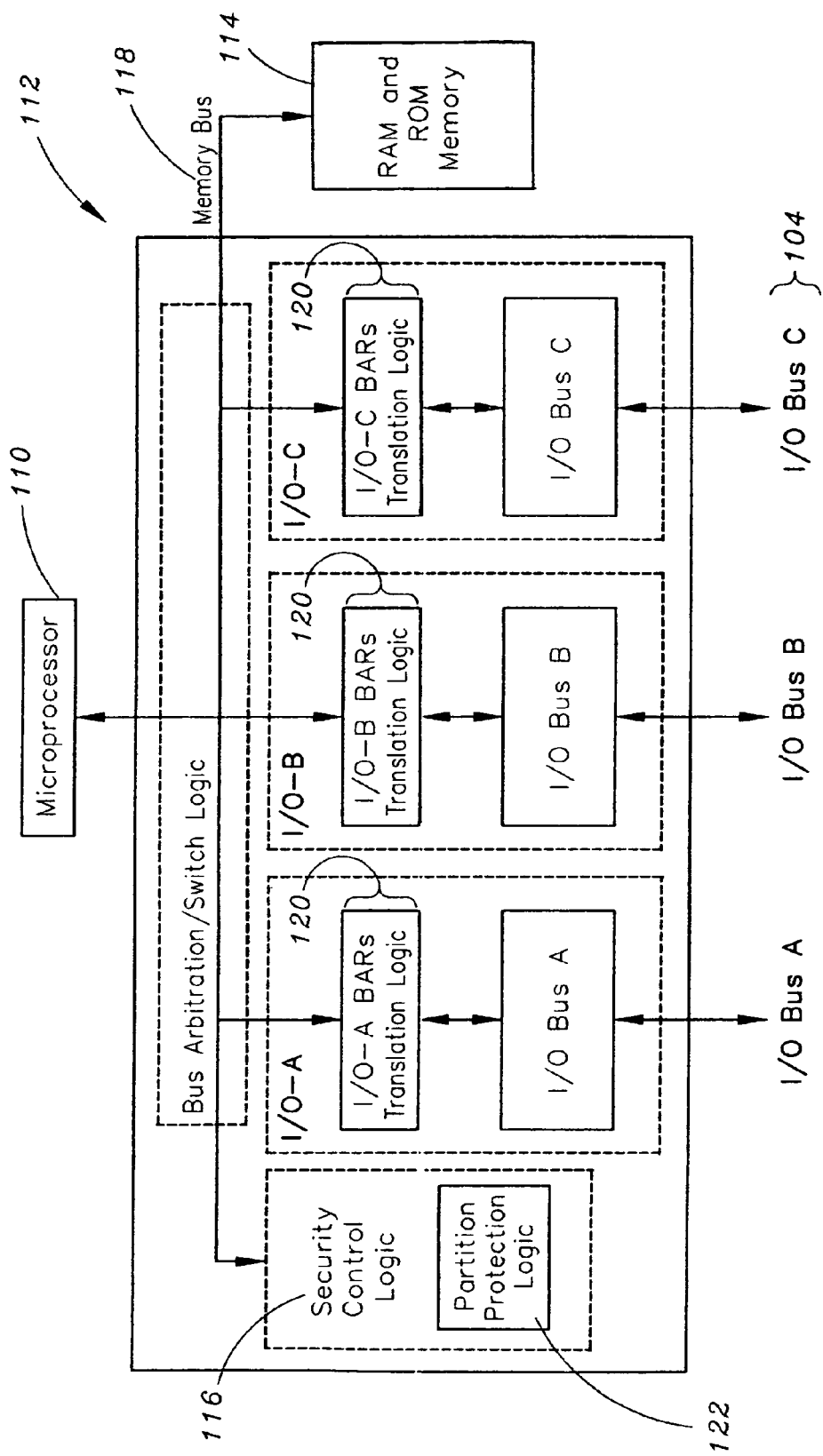
FIG. 2 is a schematic diagram of a security assisted bus controller in accordance with an exemplary embodiment of the present invention, wherein the internal organization of the controller is illustrated.

Referring to FIG. 2, the security assisted bus controller 112 included within the system 100 for extending multiple independent levels of security to the plurality of input/output buses 104 coupled to the controller 112 and the microprocessor 110 is provided. In an exemplary embodiment, the bus controller 112 includes security control logic 116 for restricting access and flow of information between the memory 114 and the plurality of buses 104 and devices 106 connected thereto. For example, access to the security control logic 116 is controlled by a memory management unit of the microprocessor 110. In an embodiment, the memory 114 includes physical memory and is communicatively coupled to the security assisted controller bus 112 by a memory bus 118. In such embodiment, the physical memory may be disposed within a microprocessor address bus.

As illustrated in FIG. 2, the controller bus 112 may employ base address registers (BARs) generally denoted as 120 to allocate and map the physical memory to control which partitions of the physical memory are accessible to each of the plurality of buses 104 and their various components 106. By allocating and mapping the physical memory and making it accessible to the I/O bus via its BARs 120 for a given operating system partition, an application in that partition may, in turn, access the devices 106 on that I/O bus. For example, as shown in FIG. 2, the controller bus 112 may be connected to three I/O devices (I/O A, I/O B, and I/O C) via three buses (I/O bus-A, I/O bus-B, and I/O bus-C, respectively). Further, in the present example, each of the BARs 120 includes translation logic. It is contemplated that each of the I/O buses 104 may be standard buses such as a PCI® or PCI-Express® buses (PCI and PCI-Express are registered trademarks of PCI SGI— Peripheral Component Interconnect Special Interest Group).

In a further embodiment, the security assisted bus controller 112 allows a component/device 106 connected to one of the plurality of input/output buses 104 to perform direct memory access (DMA), provided that the physical memory 114 being accessed is within the security assisted bus controller's 112 BAR 120 setting. For example, access outside the permitted range may result in a bus cycle aborting and a reporting of such activity to a system master.

In accordance with an additional embodiment of the present invention, the security control logic 116 includes partition protection logic 122 to monitor accesses to the physical memory 114. For example, the partition protection logic 122 includes a register for indicating partition activity. Each register may provide a base address and region length.

Further, the partition protection logic may report invalid accesses to a system master. For instance, the partition protection logic 122 prohibits future access to physical memory 114 until approved by the system master. In another embodiment, the partition protection logic 122 includes a set of registers for indicating which regions of the physical memory 114 and an input/output memory are accessible.

In the present embodiment, access to the security control logic 116, partition protection logic 122, and other registers included within the security assisted bus controller 112 may be controlled via a memory management unit of the microprocessor 110. In addition, additional mechanisms may be utilized to prevent manipulation of these registers if the memory management unit becomes compromised including, but not limited to, allowing write access to the security control logic 116 and the partition protection logic 122 registers only on device startup or reset. For example, once a "Setup Complete" signal is given, the registers become read-only. In a further embodiment, a system-wide trusted processor which is designed for use in an embedded system and includes intrinsic partitioning (e.g., AAMP7) may be utilized to monitor and control the security control logic 116 and partition protection logic 122. Such configuration provides a method of providing positive control of the security assisted bus controller 112 critical registers outside of the microprocessor's 110 memory management unit. In addition, the AAMP7 may serve as a crypto control device during normal runtime operations as well as establishing the trust level if and when a device faults.

Figure 3:
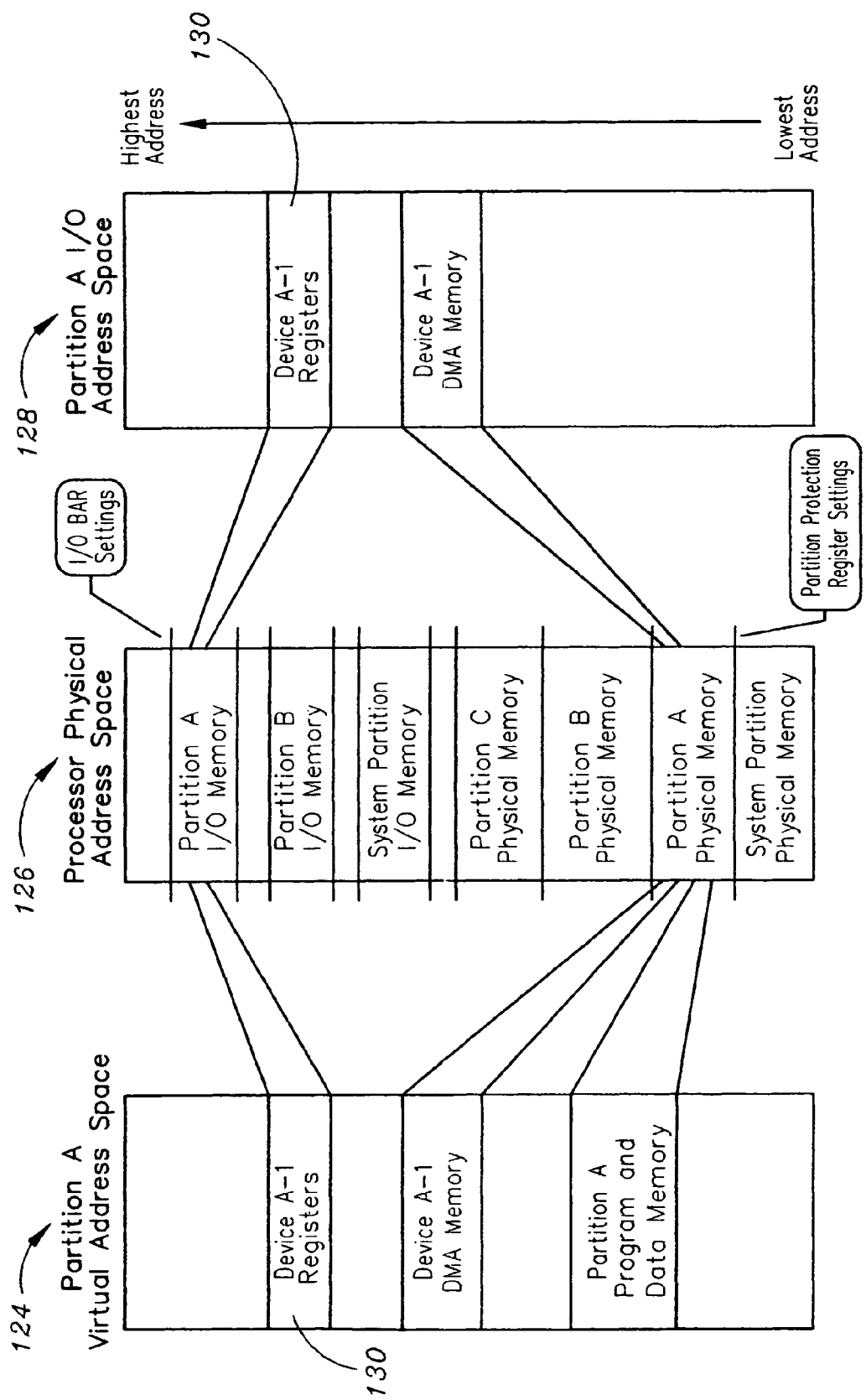
FIG. 3 is a schematic diagram of exemplary address mapping and register setups for the security assisted bus controller illustrated in FIGS. 1 and 2.

Referring to FIG. 3, an exemplary address mapping layout and register setup for the security assisted bus controller 112 is provided. As illustrated in FIG. 3, the security assisted bus controller 112 includes three distinct address spaces: (1) a virtual address space 124 for one application running in a partition; (2) a processor physical address space 126 which is observed when an address is placed on the processor address bus; and (3) a I/O address space 128 which is seen from the I/O device looking towards an internal bus of the security assisted controller bus 112. In the present configuration, the program and data memory are allocated from a partition's memory pool to create and run the application. Moreover, the I/O registers of device A-1 130 may be mapped by the I/O-A BAR in order to appear on the processor's bus. For instance, when an I/O device requires DMA the following may occur: (1) contiguous pages may be allocated from the partition's memory pool; (2) the memory region may be mapped to device A-1 by its BARs; and (3) the region may also be mapped by the memory management unit into partition A's virtual memory space.

Figure 4:
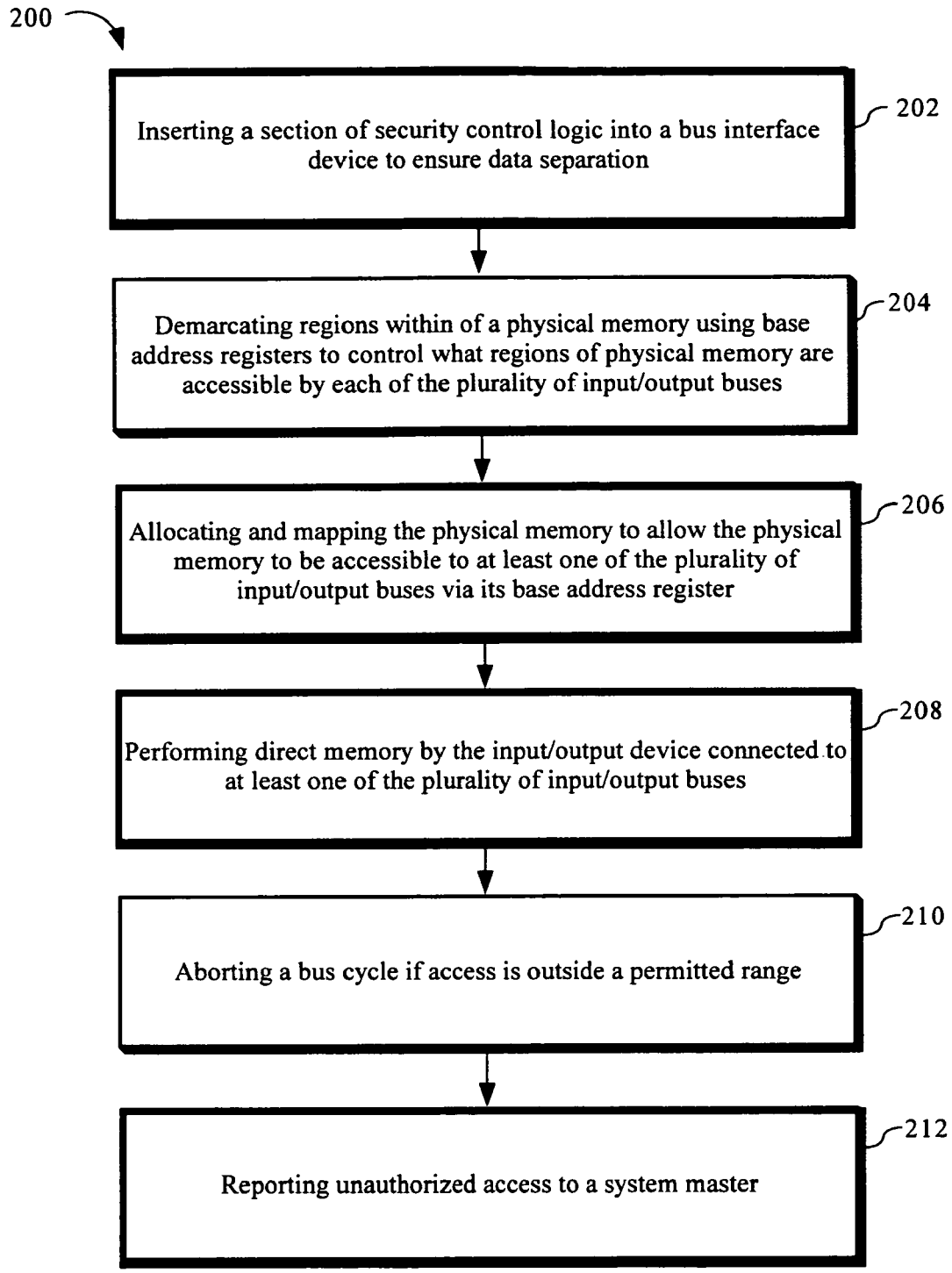
FIG. 4 is a flow diagram of a method for extending multiple independent levels of security from a partitioned operating system to a plurality of input/output buses and components/devices connected thereto in accordance with an exemplary embodiment of the present invention.

Referring to FIG. 4, a method 200 for extending multiple independent levels of security from a processing unit to a plurality of input/output buses and components/devices connected thereto in accordance with an exemplary embodiment of the present invention is provided. In the present embodiment, the method 200 includes inserting a section of security control logic into a bus interface device to ensure data separation 202. It is contemplated that the bus interface device may interface with a variety of buses including a standard multi-drop bus such as a PCI or PCI-Express bus. The method 200 may involve demarcating regions of physical memory using BARs to control what regions of physical memory are accessible by each of the plurality of input/output buses 204. The physical memory may be allocated and mapped 206 so to allow the physical memory to be accessible to at least one of the plurality of input/output buses via its base address register for a specified operating system partition. Such action may also allow an application in that partition to access the input/output device connected to the at least one of the plurality of input/output buses. In addition, the method may include performing direct memory access by the input/output device connected to the at least one of the plurality of input/output buses 208. If access is outside a permitted range, a bus cycle may be aborted 210 and such activity reported to a system master 212.

Figure 5:
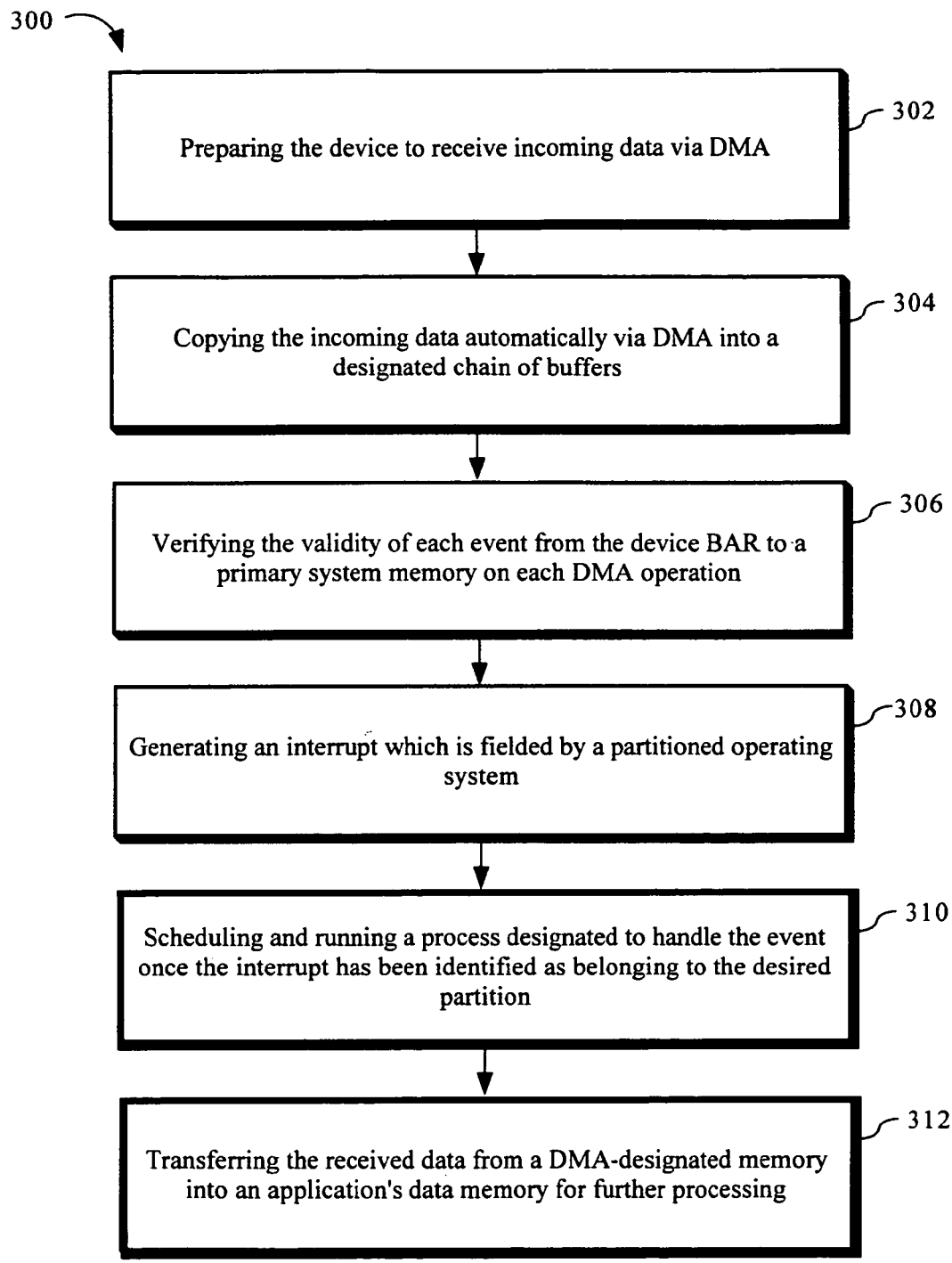
FIG. 5 is a flow diagram of an additional method for extending multiple independent levels of security from a partitioned operating system to a plurality of input/output buses and components/devices connected thereto in accordance with an exemplary embodiment of the present invention.

Referring to FIG. 5, an additional method 300 for extending multiple independent levels of security from a partitioned operating system to a plurality of input/output buses and components/devices connected thereto in accordance with an exemplary embodiment of the present invention is provided. In an embodiment, the method 300 includes preparing a device to receive incoming data via DMA 302. The preparation of the device may include allocating the device's physical memory, mapping the physical memory into a partition's virtual address space and programming a BAR on the device to reveal the physical memory.

The method 300 may also include copying the incoming data automatically via DMA into a designated chain of buffers 304. For instance, the designated chain of buffers may have be setup when it the device is prepared to receive the data. In addition, the method 300 may include verifying the validity of each movement from a device register to a primary system memory on each DMA operation 306. The method 300 may also involve generating an interrupt which is fielded by a partitioned operating system 308. For example, on completion of the input event, a device generates an interrupt that is fielded by a kernel portion of the partitioned operating system.

In additional embodiments, the method 300 including scheduling and running a process designated to handle the event once the interrupt has been identified as belonging to the desired partition 310. For example, the process or thread designated to handle the event may be scheduled and run during the partition's time slice. Further, the method 300 may include transferring the received data from a DMA-designated memory into the application's data memory for further processing as required 312. As such process occurs, the security assisted bus controller may verify that the memory accesses indeed belong to the partition.

It is to be noted that the foregoing described embodiments according to the present invention may be conveniently implemented using conventional general purpose digital computers programmed according to the teachings of the present specification, as may be apparent to those skilled in the computer art. Appropriate software coding may readily be prepared by skilled programmers based on the teachings of the present disclosure, as may be apparent to those skilled in the software art. It is also to be noted that the present invention may be implemented in a variety of forms including a field programmable gate array as contemplated by one of ordinary skill in the art.

It is believed that the present invention and many of its attendant advantages will be understood by the foregoing description. It is also believed that it will be apparent that various changes may be made in the form, construction and arrangement of the components thereof without departing from the scope and spirit of the invention or without sacrificing all of its material advantages. The form herein before described being merely an explanatory embodiment thereof. It is the intention of the following claims to encompass and include such changes.

What is claimed is:

1. A system for extending multiple independent levels of security, comprising:

a processing unit suitable for operation in a plurality of security levels;

a bus controller operatively coupled to the processing unit, the bus controller including:

security control logic for restricting access and flow of information between a physical memory and a plurality of input/output buses; and partition protection logic, the partition protection logic being configured for monitoring accesses to the physical memory, the partition protection logic including a set of registers for indicating which regions of the physical memory and an input/output memory are accessible and for indicating partition activity, the partition protection logic being configured for reporting invalid accesses to a system master and for prohibiting future access to physical memory until approval is provided by the system master, wherein the bus controller employs base address registers to allocate and map the physical memory to control which partitions of the physical memory are accessible to each of the plurality of buses, extending multiple independent levels of security to the plurality of input/output buses.

2. The system as claimed in claim 1, wherein the processing unit includes a memory management unit.

3. The system as claimed in claim 2, wherein the memory management unit controls access to at least one of: the security control logic; and the partition protection logic.

4. The system as claimed in claim 1, wherein the physical memory is disposed within a processor address bus.

5. The system as claimed in claim 1, wherein the bus controller allows a device connected to one of the plurality of input/output buses to perform direct memory access if the physical memory being accessed is within the bus controller's base address register setting.

6. A bus controller for extending multiple independent levels of security, comprising:

security control logic for restricting access and flow of information between a physical memory and a plurality of input/output buses;

partition protection logic, the partition protection logic being configured for monitoring accesses to the physical memory, the partition protection logic including a set of registers for indicating which regions of the physical memory and an input/output memory are accessible and for indicating partition activity, the partition protection logic being configured for reporting invalid accesses to a system master and for prohibiting future access to physical memory until approval is provided by the system master; and a plurality of base address registers to control physical memory access by each of the plurality of input/output buses, the base address registers each including translation logic, wherein the plurality of base address registers are utilized to allocate and map the physical memory making the physical memory accessible to at least one of the plurality of input/output buses via its base address register for a designated operating system partition so that an application within that partition is allowed access to a device on that at least one of the plurality of input/output buses.

7. The method as claimed in claim 6, wherein the physical memory is disposed within a processor address bus.

* * * * *